W. A. ASHE.
Securing Tires on Wheels.
No. 15,214. Patented July 1, 1856
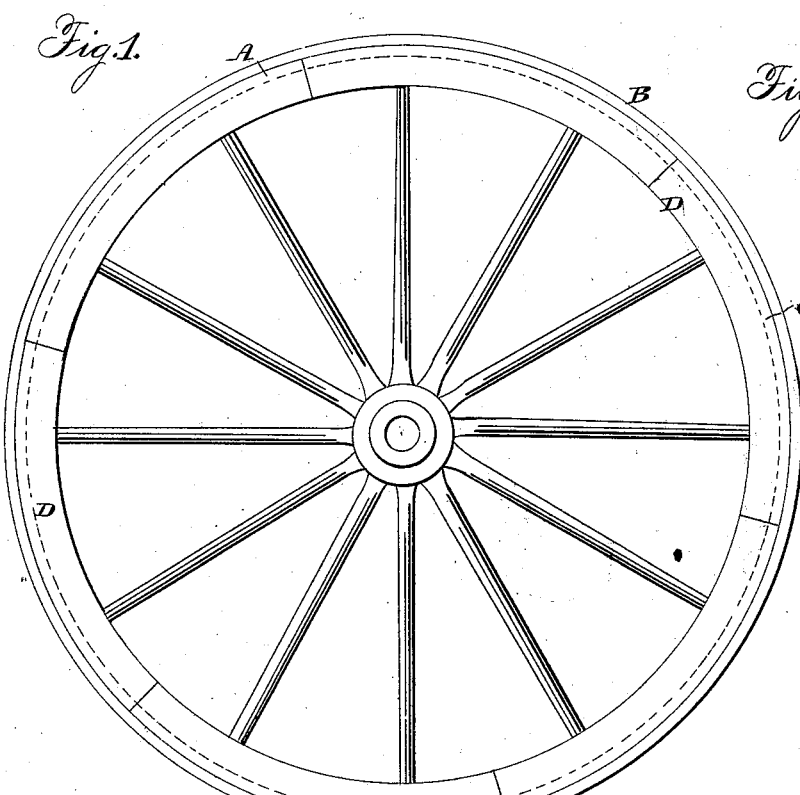
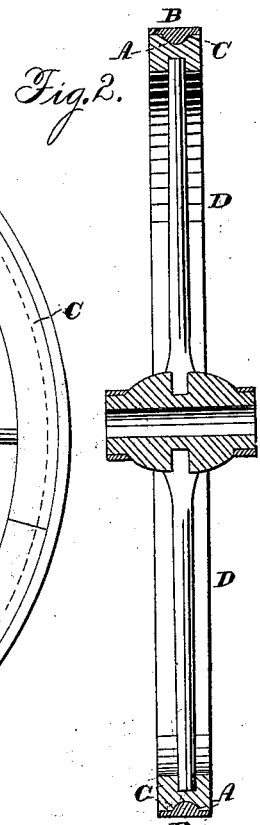
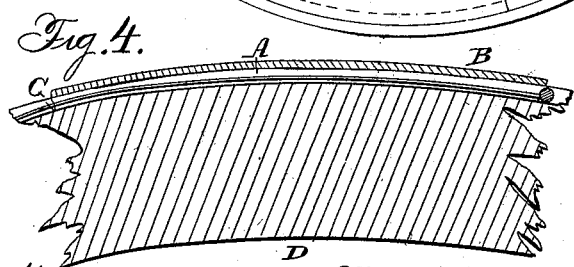
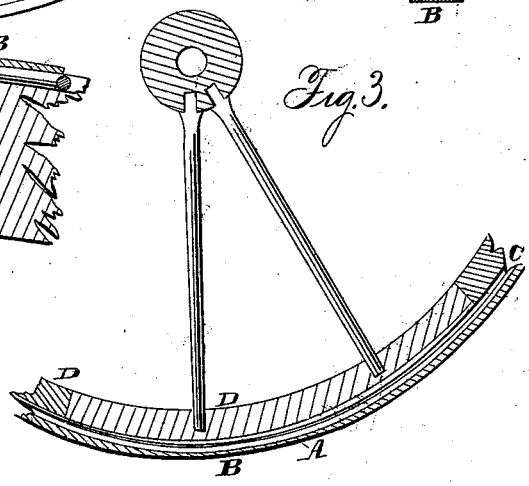
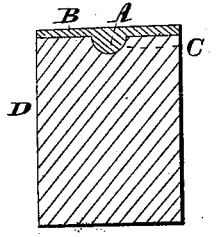
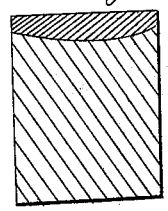

UNITED STATES PATENT OFFICE.

WILLIAM A. ASHE, OF NEW YORK, N. Y.

MODE OF SECURING TIRES ON WHEELS.

Specification of Letters Patent No. 15,214, dated July 1, 1856.

*To all whom it may concern:*

Be it known that I, WILLIAM A. ASHE, of New York city, in the county of New York and State of New York, have invented a new and useful Improvement in the Construction of Tires and Mode of Securing the same on Carriage Wheels; and I do hereby declare that the following is a full, clear, and exact description of the same, reference being had to the accompanying drawings, forming art of this specification, in which—

Figure 1, is a side elevation; Fig. 2, is a vertical transverse section; and Fig. 3, a broken vertical longitudinal section of a carriage wheel having my improvement applied to it; Figs. 4, and 5, are enlarged views of the same; Fig. 6, is a section of a felly having the tire secured to it, after William Losh's invention.

Similar letters of reference in each of the several figures indicate corresponding parts.

My invention is intended to be applied especially to carriage wheels, and before stating its nature I deem it necessary to remark that I am aware that Wm. Losh obtained a patent in England in the year 1836, for a method of securing tire on car wheels, without the aid of bolts, and that my improvement is intended to aid in carrying out more fully said method and render it more effective and advantageous.

The nature of my improvement consists in forming a narrow tongue, A, at the center of, and on the inner circumference of the tire, B, and a deep, narrow groove C, of corresponding shape to the tongue, in the outer periphery of the circle of fellies D, D, for the purpose of securely confining the tire on the wheel without the aid of bolts or hold fasts, and at the same time avoiding a liability of the tire, from shrinkage of the wood, getting loose and rattling, and consequently loosing its hold upon the fellies and allowing them to separate at the joints to a certain extent and thus impair durability of the wheel, as will be evident from the following.

By having the tongue narrow and long and to fit in a deep narrow groove, the metal of the tire, on either side of said tongue, can be made quite thin and of unvarying thickness from the tongue to the edges of the tire, and owing to the said portions of the tire being thus made they, from constant contact with the pavement, roll down and come in close contact with the wood and bind the whole together, and prevent the disadvantages above stated, when shrinkage in the wood occurs.

With Losh's invention these objects cannot be accomplished as perfectly, if at all, owing to the tire being made nearly as thick at the edges as at the center, as will be evident from Fig. 6, of the drawing, and consequently almost as capable of bending at the center as near the edges, when shrinkage in the fellies takes place.

To apply a tire made after my invention, the ordinary method of heating to red heat before placing it around the fellies, and shrinking immediately by water after placing around the fellies, is resorted to. As the tire shrinks, its tongue enters the groove, C, and the thin portions of the tire fit snugly on the periphery of the circle of fellies, and thus the whole is locked firmly together without the aid of the bolts or hold fasts commonly used.

Having thus described my invention, I wish it to be distinctly understood that I do not claim securing the tire on a car wheel after the method illustrated in Fig. 6, of the drawing as this is quite old; but

What I do claim as my invention and desire to secure by Letters Patent, is—

Making the tire, B, with a narrow tongue, A, at the center of its width on its inner circumference and the outer periphery of the circle of fellies with a groove C, to receive said tongue, for the purpose of confining the tire on the wheel, and in order that the metal on the tire on either side of said tongue may be made quite thin and of unvarying thickness from the tongue to the side edges of the tire, substantially and as for the purpose set forth.

W. A. ASHE.

Witnesses:
O. D. MUNN,
JAMES F. BUCKLEY.